US012551396B2

(12) United States Patent
Zeutzius et al.

(10) Patent No.: US 12,551,396 B2
(45) **Date of Patent: *Feb. 17, 2026**

(54) PORTABLE INTERMITTENT PNEUMATIC COMPRESSION SYSTEM

(71) Applicant: Impact IP, LLC, Rocklin, CA (US)

(72) Inventors: Turner Lucas Zeutzius, Horseshoe Bay, TX (US); Wade Williams, Woods Cross, UT (US); Joseph Zeutzius, San Antonio, TX (US)

(73) Assignee: Impact IP, LLC, Rocklin, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/141,480

(22) Filed: Jan. 5, 2021

(65) Prior Publication Data

US 2021/0128397 A1 May 6, 2021

Related U.S. Application Data

(63) Continuation of application No. 16/045,870, filed on Jul. 26, 2018, now Pat. No. 10,912,704, which is a continuation of application No. 14/217,213, filed on Mar. 17, 2014, now Pat. No. 10,058,475.

(60) Provisional application No. 61/794,235, filed on Mar. 15, 2013.

(51) Int. Cl.
*A61H 9/00* (2006.01)

(52) U.S. Cl.
CPC ... *A61H 9/0092* (2013.01); *A61H 2201/0103* (2013.01); *A61H 2201/164* (2013.01); *A61H 2201/165* (2013.01); *A61H 2201/5002* (2013.01); *A61H 2201/5071* (2013.01); *A61H 2205/106* (2013.01); *A61H 2209/00* (2013.01)

(58) Field of Classification Search
CPC ........ A61H 9/00; A61H 9/005; A61H 9/0078; A61F 5/012; A61F 5/05816
See application file for complete search history.

(56) References Cited

U.S. PATENT DOCUMENTS

| | | | |
|---|---|---|---|
| 3,859,989 | A | 1/1975 | Spielberg |
| 4,320,746 | A | 3/1982 | Arkans et al. |
| 4,320,747 | A | 3/1982 | Arkans |
| 4,331,133 | A | 5/1982 | Arkans |
| 4,374,518 | A | 2/1983 | Villanueva |
| 4,402,312 | A | 9/1983 | Villari et al. |
| 4,453,538 | A | 6/1984 | Whitney |
| 4,597,384 | A | 7/1986 | Whitney |
| 5,031,604 | A | 7/1991 | Dye |
| 5,109,832 | A | 5/1992 | Proctor et al. |
| 5,307,791 | A | 5/1994 | Senoue et al. |
| 5,437,610 | A | 8/1995 | Cariapa |
| 5,478,119 | A | 12/1995 | Dye |

(Continued)

OTHER PUBLICATIONS

Notice of Allowance dated Jul. 13, 2018 for U.S. Appl. No. 14/217,213.

(Continued)

*Primary Examiner* — Justine R Yu
*Assistant Examiner* — Christopher E Miller
(74) *Attorney, Agent, or Firm* — Dorsey & Whitney LLP

(57) ABSTRACT

An intermittent pneumatic compression system provides exhaust between a wrap and patient's leg, avoids tubes and is operable on a conventional battery. The system allows true portability while improving patient discomfort, reducing fall risks, and providing desired therapeutic and prophylactic compression.

17 Claims, 13 Drawing Sheets

(56) References Cited

U.S. PATENT DOCUMENTS

| | | | |
|---|---|---|---|
| 5,496,262 | A | 3/1996 | Johnson et al. |
| 5,588,955 | A | 12/1996 | Johnson et al. |
| 5,626,556 | A | 5/1997 | Tobler et al. |
| 5,672,148 | A | 9/1997 | Maunier |
| 5,795,312 | A | 8/1998 | Dye |
| 5,876,359 | A | 3/1999 | Bock et al. |
| 6,030,353 | A | 2/2000 | Van Brunt |
| 6,231,532 | B1 | 5/2001 | Watson et al. |
| 6,290,662 | B1 | 9/2001 | Morris et al. |
| 6,315,745 | B1 | 11/2001 | Kloecker |
| 6,336,907 | B1 | 1/2002 | Dono et al. |
| 6,537,235 | B1 | 3/2003 | Connor |
| 7,044,924 | B1 | 5/2006 | Roth et al. |
| 7,354,410 | B2 | 4/2008 | Perry |
| 7,771,453 | B2 | 8/2010 | McEwen et al. |
| 7,935,066 | B2 | 5/2011 | Shives et al. |
| 8,048,105 | B2 | 11/2011 | Mcewen et al. |
| 8,079,970 | B2 | 12/2011 | Meyer |
| 8,177,734 | B2 | 5/2012 | Vess |
| 8,257,289 | B2 | 9/2012 | Vess |
| 8,403,870 | B2 | 3/2013 | Vess |
| 8,449,483 | B2 | 5/2013 | Eddy |
| 8,535,253 | B2 | 9/2013 | Vess |
| 9,044,372 | B2 | 6/2015 | Wild et al. |
| 9,114,055 | B2 | 8/2015 | Edelman et al. |
| 9,433,532 | B2 | 9/2016 | Vess |
| 9,737,238 | B2 | 8/2017 | Wright et al. |
| 9,872,812 | B2 | 1/2018 | Malhi et al. |
| 10,561,571 | B2 | 2/2020 | Jackson et al. |
| 10,813,825 | B2 | 10/2020 | Schubert |
| 10,859,173 | B2 | 12/2020 | Ben-Shalom et al. |
| 2001/0000262 | A1 | 4/2001 | McEwen et al. |
| 2002/0042583 | A1 | 4/2002 | Barak et al. |
| 2003/0078674 | A1 | 4/2003 | Phillips |
| 2003/0181990 | A1 | 9/2003 | Phillips |
| 2004/0039317 | A1 | 2/2004 | Souney |
| 2004/0237203 | A1 | 12/2004 | Romano et al. |
| 2005/0070828 | A1 | 3/2005 | Hampson et al. |
| 2005/0143797 | A1 | 6/2005 | Parrish |
| 2005/0154336 | A1 | 7/2005 | Kloecker et al. |
| 2005/0187500 | A1 | 8/2005 | Perry et al. |
| 2005/0256556 | A1 | 11/2005 | Schirrmacher |
| 2006/0236464 | A1 | 10/2006 | Beck et al. |
| 2007/0049853 | A1 | 3/2007 | Adams et al. |
| 2007/0213650 | A1 | 9/2007 | Raley et al. |
| 2008/0058911 | A1 | 3/2008 | Parish et al. |
| 2008/0132976 | A1 | 6/2008 | Kane et al. |
| 2008/0262399 | A1 | 10/2008 | Kovelman |
| 2009/0177184 | A1 | 7/2009 | Christensen et al. |
| 2009/0299239 | A1 | 12/2009 | Meyer et al. |
| 2010/0042026 | A1 | 2/2010 | Kloecker et al. |
| 2010/0081974 | A1 | 4/2010 | Vess |
| 2010/0081977 | A1 | 4/2010 | Vess |
| 2010/0100017 | A1 | 4/2010 | Maguina |
| 2010/0137764 | A1 | 6/2010 | Eddy |
| 2011/0082401 | A1 | 4/2011 | Iker et al. |
| 2011/0131839 | A1 | 6/2011 | Ballin et al. |
| 2011/0172579 | A1 | 7/2011 | Chiu et al. |
| 2011/0201981 | A1 | 8/2011 | Deshpande |
| 2011/0224589 | A1 | 9/2011 | Bock |
| 2011/0288458 | A1 | 11/2011 | Jones |
| 2012/0065561 | A1 | 3/2012 | Ballas |
| 2012/0078145 | A1 | 3/2012 | Malhi et al. |
| 2012/0078146 | A1 | 3/2012 | Deshpande |
| 2012/0089063 | A1 | 4/2012 | Olson |
| 2012/0209153 | A1 | 8/2012 | Farrow et al. |
| 2013/0012847 | A1 | 1/2013 | Lowe |
| 2013/0085429 | A1 | 4/2013 | Nelsen |
| 2013/0245519 | A1 | 9/2013 | Edelman et al. |
| 2013/0253383 | A1 | 9/2013 | Maxon-Maldonado |
| 2013/0310719 | A1 | 11/2013 | Davis et al. |
| 2013/0338552 | A1 | 12/2013 | Malhi |
| 2014/0094726 | A1 | 4/2014 | Malhi |
| 2014/0222121 | A1 | 8/2014 | Spence et al. |
| 2014/0276254 | A1 | 9/2014 | Varga et al. |
| 2014/0303533 | A1 | 10/2014 | Zeutzius |
| 2016/0361224 | A1 | 12/2016 | Ramakrishna et al. |
| 2017/0319420 | A1 | 11/2017 | Saggers |
| 2019/0282162 | A1 | 9/2019 | Watson et al. |
| 2020/0093383 | A1 | 3/2020 | Arkans et al. |

OTHER PUBLICATIONS

Notice of Allowance dated Nov. 25, 2020 for U.S. Appl. No. 16/045,870.
Office Action dated Mar. 27, 2020 for U.S. Appl. No. 16/045,870.
Office Action dated Mar. 29, 2018 for U.S. Appl. No. 14/217,213.
Office Action dated Jun. 13, 2017 for U.S. Appl. No. 14/217,213.
Office Action dated Jul. 22, 2020 for U.S. Appl. No. 16/045,870.
Office Action dated Nov. 9, 2017 for U.S. Appl. No. 14/217,213.

PORTABLE INTERMITTENT PNEUMATIC COMPRESSION SYSTEM

PRIORITY CLAIM

This application is a nonprovisional and claims the benefit of priority of U.S. nonprovisional application Ser. No. 16/045,870 filed on Jul. 26, 2018, which claims the benefit of priority of U.S. nonprovisional application Ser. No. 14/217,213 filed on Mar. 17, 2014, which is now U.S. Pat. No. 10,058,475, and claims the benefit of provisional application No. 61/794,235 filed Mar. 15, 2013. The entire contents of all three prior applications are incorporated herein.

FIELD OF THE INVENTION

This invention relates to intermittent pneumatic compression systems, and, more particularly, to a portable intermittent pneumatic compression system that provides exhaust between the wrap and patient's leg and avoids tubes.

BACKGROUND

A major concern for immobile patients and like persons are medical conditions that form clots in the blood, such as, deep vein thrombosis (DVT) and peripheral edema. These conditions associated with patient immobility may be controlled or alleviated by applying intermittent pressure to a patient's limb, such as, for example, a leg to assist in blood circulation. Such compression devices are typically constructed of two sheets of material secured together at the seams to define one or more fluid impervious bladders, which are connected by tubes to a source of pressure for applying sequential pressure around a patient's body parts for improving blood return to the heart.

Shortcomings of such devices are numerous. Typically, such devices require tubing, which present a tripping hazard and are inconvenient to use and manage. Additionally, such devices typically lack true portability. Conventional pumping systems are usually dependent upon an AC power source and too bulky to provide a patient meaningful opportunity to travel while using the system. Furthermore, conventional devices cause discomfort to a patient by preventing or severely limiting circulation to the patient's wrapped limb. As a result, patients often complain of sweat, soreness and general discomfort of the limb. Moreover, conventional systems obtain pressure readings at the inlet port, which does not necessarily provide an accurate measure of pressure at the most remote parts of a bladder. Thus, the requisite pressures may not be achieved at such remote parts of the bladder during pumping.

The invention is directed to overcoming one or more of the problems and solving one or more of the needs as set forth above.

SUMMARY OF THE INVENTION

To solve one or more of the problems set forth above, in an exemplary implementation of the invention, an intermittent pneumatic compression system that provides exhaust between the wrap and patient's leg, avoids tubes and is operable on a conventional battery is provided. The system allows true portability while improving patient discomfort, reducing fall risks, and providing the desired therapeutic and prophylactic compression.

An exemplary portable intermittent pneumatic compression system according to principles of the invention includes a pumping module. The pumping module includes a housing containing an air pump having a pump inlet and a pump outlet, a valve having a valve inlet and at least two additional ports including an inflation port and a ventilation port, a power supply such as disposable or rechargeable battery and/or a power outlet, an electronic control unit (e.g., a programmed microcontroller), and a fluid coupling such as a tube connecting the pump outlet to the valve inlet. The pumping module may be attached to the flexible inflatable wrap and worn by a user.

An exemplary flexible inflatable wrap contains an inflatable bladder and has an outer surface and an opposite inner surface that abuts a wearer when the wrap is worn. The flexible inflatable wrap includes a first fluid port in fluid communication with the inflatable bladder, and a second port that extends through the wrap to the inner surface. The second port is not in fluid communication with the inflatable bladder. Air flowing through the second port ventilates the wearer's wrapped limb.

The inflation port of the valve is fluidly coupled to the first port of the inflatable wrap, and the ventilation port of the valve is fluidly coupled to the second port of the inflatable wrap. The valve is switchable from an inflation state in which air may flow from the valve inlet to the inflation port through the first port of the inflatable wrap and into the bladder, to an inflated state in which air does not flow through the inflation port, to a ventilation state in which air may flow from the bladder through the first port and through the inflation port through the ventilation port and through the second port of the inflatable wrap and through the inner surface of the flexible inflatable wrap. The valve may be a solenoid valve, such as a three state (i.e., three position) solenoid valve.

The control unit is operably coupled to the valve and controls switching of the valve repeatedly from the inflation state, then to the inflated state and then to the ventilation state, sequentially (i.e., in that order until stopped by user intervention—e.g., powering off).

A pressure sensor is operably coupled to the control unit and a fluid channel fluidly coupling the pressure sensor to the bladder. The pressure sensor produces a pressure signal corresponding to pressure sensed in the bladder. The control unit receives the pressure signal. The control unit causes the valve to remain in the inflation state until the pressure sensor senses a determined pressure.

The bladder may include a plurality of compartments fluidly coupled by at least one flow restricting fluid passage. The flow restricting fluid passage allows fluid flow from one compartment to another, albeit at a reduced flow rate as compared to an unrestricted flow rate. The plurality of compartments include a first compartment and a second compartment. The first fluid port is on the first compartment, and a pressure port is on the second compartment. The pressure port is in fluid communication with the second compartment, and the fluid channel is fluidly connected to the pressure port. The first compartment inflates before the second compartment during the inflation state. The first compartment deflates before the second compartment during the ventilation state. The inner surface of the flexible inflatable wrap may include a fluid permeable flexible material.

An exemplary method of providing intermittent pneumatic compression of a limb is also provided. The method includes steps of:

wrapping at least a portion of the limb with a flexible inflatable wrap containing an inflatable bladder and having an outer surface and an opposite inner surface that abuts the limb when the wrap is worn, the flexible inflatable wrap including a first fluid port in fluid communication with the inflatable bladder, and a second port that extends through the wrap to the inner surface, the second port not is in fluid communication with the inflatable bladder;

supplying compressed air through the first port of the inflatable wrap and into the bladder, inflating the bladder, until a first condition is determined (the "inflation step"), after the first condition is determined, maintaining the bladder in an inflated state until a second condition is determined (the "inflated step"), and after the first condition is determined, ventilating air from the bladder through the first port and into the second port of the inflatable wrap and through the inner surface of the flexible inflatable wrap (the "ventilation step").

Pressure may be sensed in the bladder. The first condition comprising sensing a determined pressure. The second condition may be the passage of a determined timeduration (e.g., a determined number of seconds).

The inflation, inflated and ventilation steps may be repeated sequentially until the method is concluded, such as by powering down. The inflation, inflated and ventilation steps may be controlled using a solenoid valve (e.g., a three-position solenoid valve) switchable between a plurality of states.

The compressed air may be supplied from a pumping module that may be attached to the flexible inflatable wrap.

The bladder may have a plurality of compartments fluidly coupled by at least one flow restricting fluid passage. The plurality of compartments include a first compartment and a second compartment. The step of supplying compressed air through the first port of the inflatable wrap and into the bladder, inflating the bladder, until a first condition is determined, entails inflating the first compartment before the second compartment. The step of ventilating air from the bladder through the first port and into the second port of the inflatable wrap and through the inner surface of the flexible inflatable wrap, entails deflating the first compartment before the second compartment. Pressure may be sensed in the second compartment.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
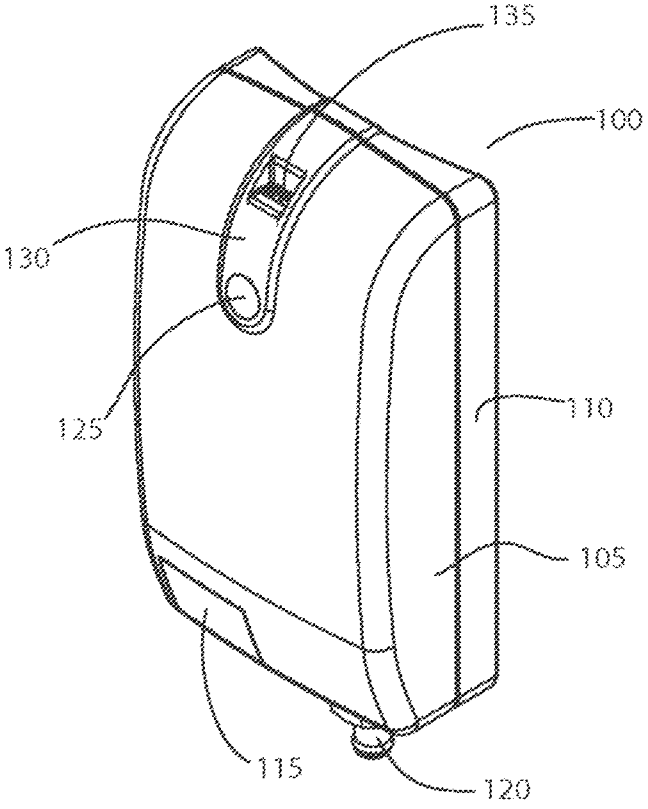
FIG. 1 is a top perspective view of an exemplary controller module for a portable intermittent pneumatic compression system according to principles of the invention.

Referring to FIG. 1, a top perspective view of an exemplary controller module 100 for a portable intermittent pneumatic compression system according to principles of the invention is shown. The module includes a front cover 105, a back cover 110 which is curved to accommodate the shape of a limb, an auxiliary fill port 120, a battery cover 115 leading to a battery compartment, transparent or translucent windows 125, 130 for visibility of status lights contained in the module 100.

The auxiliary fill port 120 is an optional feature which, in one embodiment, includes a fitting for coupling the module 100 to wraps with fillable bladders other than the wrap as described herein. When the module 100 is used with the wrap described herein, the auxiliary fill port 120 is not used.

In an alternative embodiment, the auxiliary fill port 120 is a removable adapter that may be connected to a fill port of a wrap in accordance with principles of the invention. By connecting one or more auxiliary fill ports 120 to the wrap, the wrap is adapted for use with other control modules. There may be a range of conventional control modules available in the marketplace. Thus, the port 120 enhances versatility of the wrap by making it compatible for inflation by other control modules. The sensor port in the wrap can be capped or also used as a fill port, when the wrap is adapted for use with a control module other than a control module according to principles as described herein.

Figure 2:
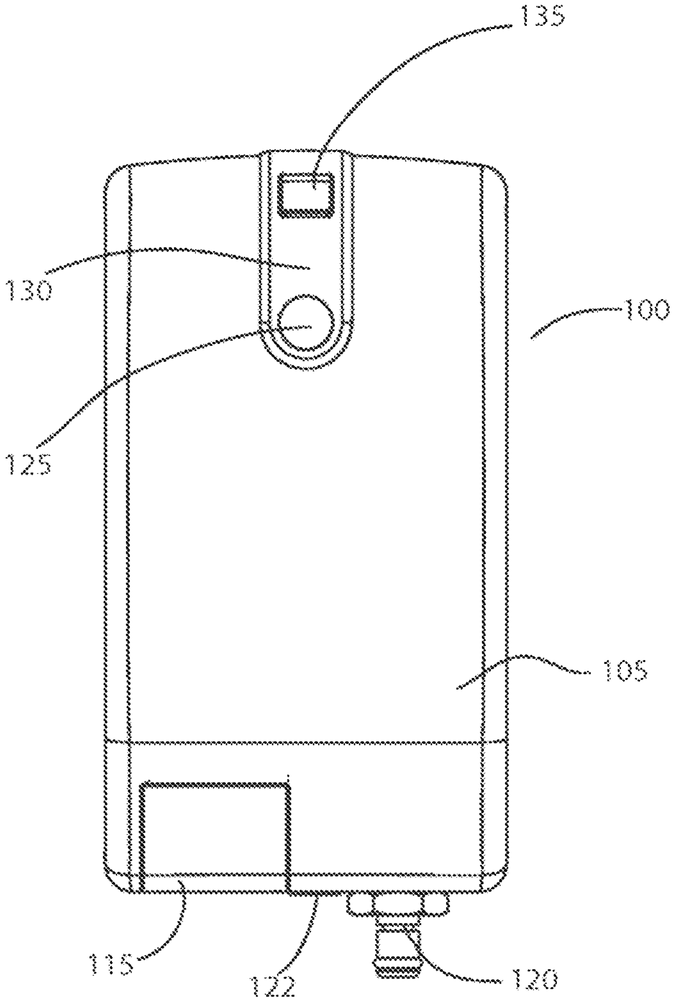
FIG. 2 is a front view of an exemplary controller module for a portable intermittent pneumatic compression system according to principles of the invention.
Figure 3:
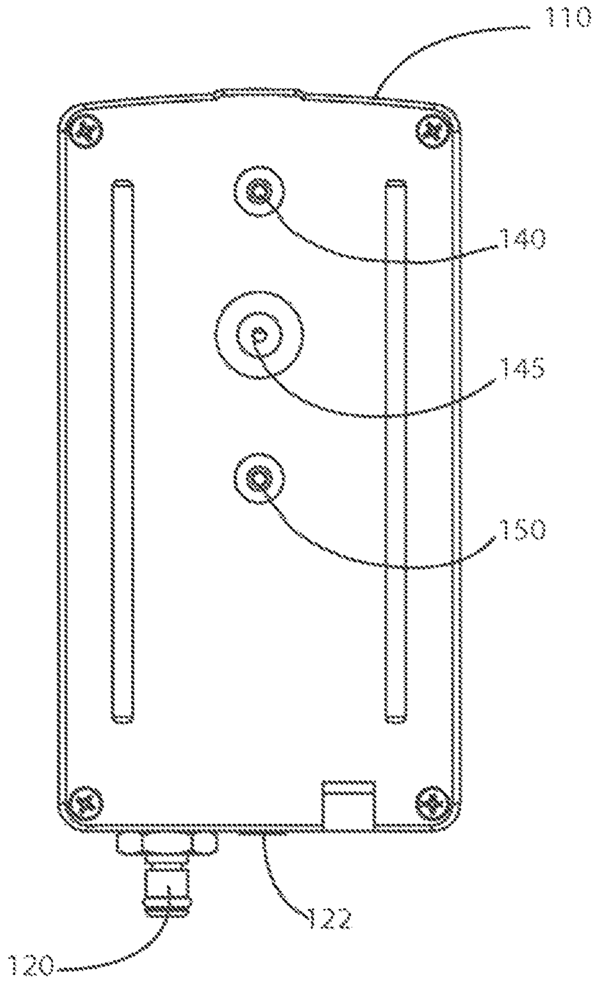
FIG. 3 is a back view of an exemplary controller module for a portable intermittent pneumatic compression system according to principles of the invention.
Figure 4:
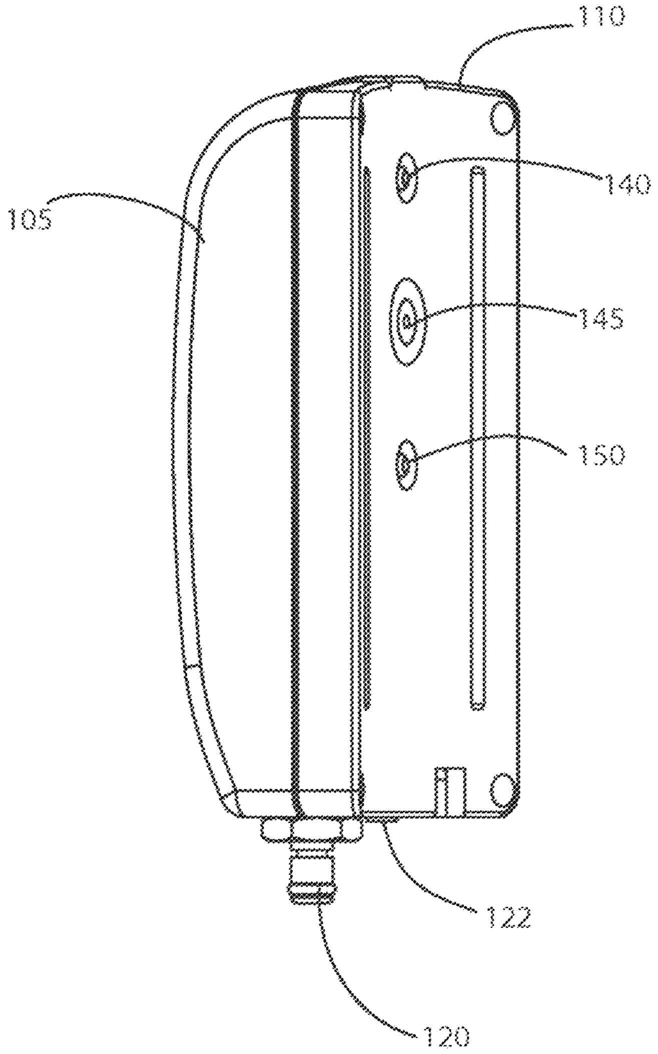
FIG. 4 is a side perspective view of an exemplary controller module for a portable intermittent pneumatic compression system according to principles of the invention.

As shown in FIGS. 2 through 4, the module 100 includes a sensor port 140, a ventilation port 145 and a fill port 150. The sensor port 140 is fluidly coupled to a pressure sensor in the module 100, as discussed in more detail below with reference to FIG. 8. The module 100 monitors pressure during filling, provides visible and/or audible alarm signals to indicate problems with inadequate inflation and low pressure, and ceases filling when a determined pressure (or a pressure within a range) has been reached.

Figure 8:
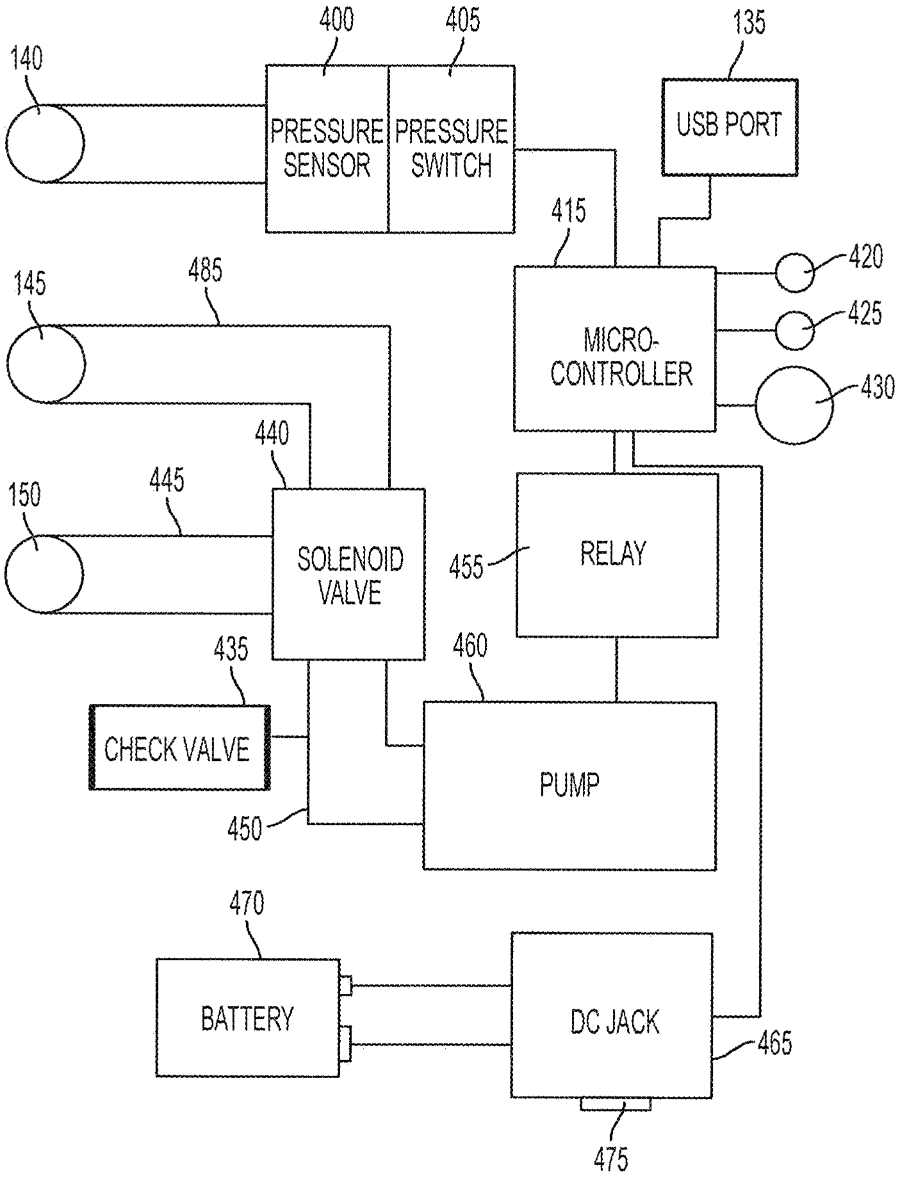
FIG. 8 is a high level block diagram conceptually illustrating electronic, electromechanical and pneumatic components of an exemplary controller module for a portable intermittent pneumatic compression system according to principles of the invention.

The ventilation port 145 is fluidly coupled to a solenoid valve in the module as discussed in more detail below with reference to FIG. 8. Compressed air from an inflated bladder flows from the bladder through the fill port 150 through the solenoid valve and through the ventilation port 145 during a ventilation cycle.

The fill port 150 is fluidly coupled to a solenoid valve in the module, which is fluidly coupled to a pump in the module, as discussed in more detail below with reference to FIG. 8. The fill port supplies pressurized air to the bladder. During a fill cycle, compressed air flows from the pump, through the solenoid and through the fill port 150 into the inflatable bladder. During a ventilation cycle, compressed air from an inflated bladder flows from the bladder through the fill port 150 through the solenoid valve and through the ventilation port 145.

A data communications port, such as a universal serial bus (USB) port 135 is also provided for data acquisition and/or remote control. Remote control is particularly advantageous for patients with limited mobility and reach. The USB port 135 is communicatively coupled to a microcontroller contained in the module 100, as discussed in more detail below with reference to FIG. 8.

Figure 5:
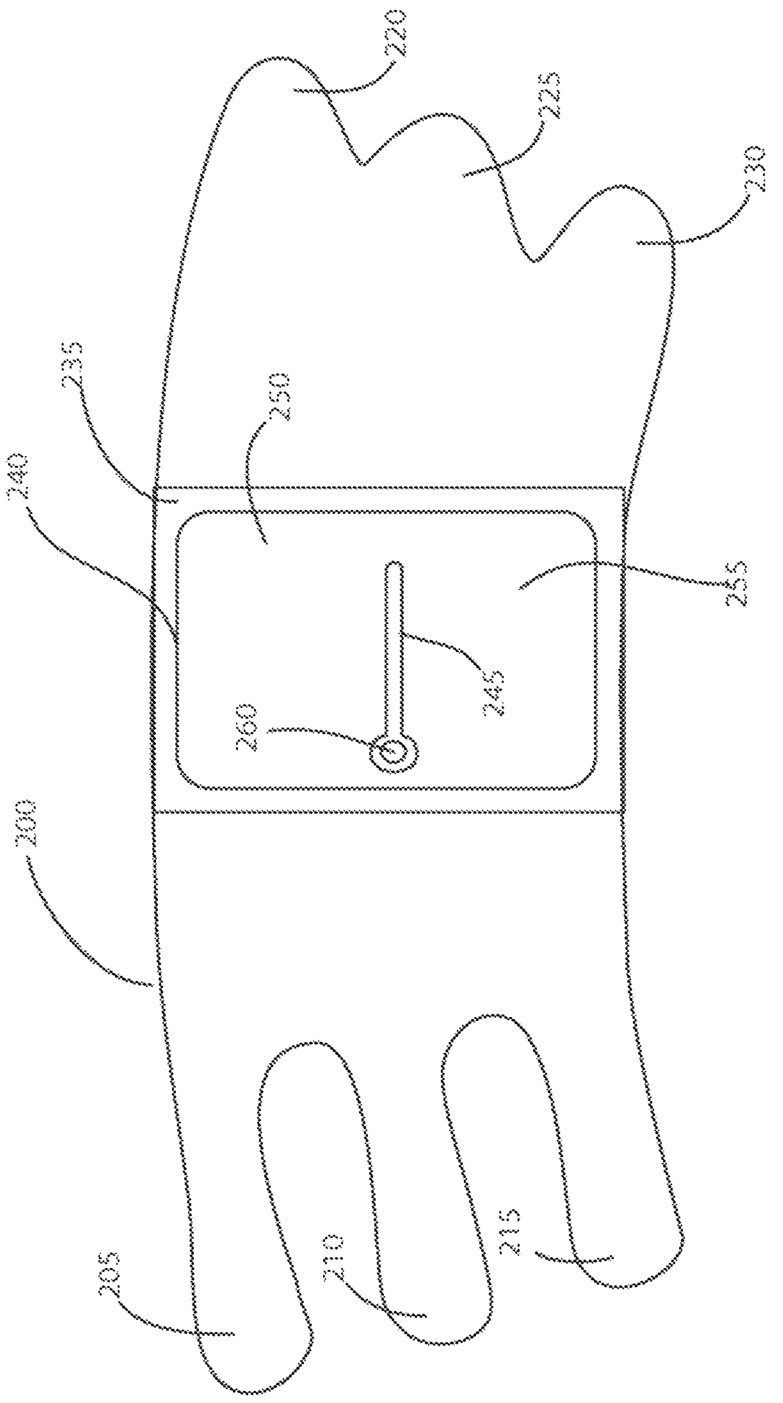
FIG. 5 is a bottom (i.e., patient side) view of an exemplary compression wrap for a portable intermittent pneumatic compression system according to principles of the invention.

With reference to FIG. 5, an exemplary compression wrap 200 according to principles of the invention is sized and shaped to be wrapped around the lower leg (calf and shin) of a patient. The compression wrap 200 includes an inflatable bladder 240, divided in a plurality of (e.g., 2) sections 250 and 255. The number and/or configuration of bladders may be other than shown in the illustrated embodiment. The inflatable bladder comprises opposing inner and outer bladder layers secured to one another along bladder sealing lines 235. Another sealing line 245 divides the bladder into distinct section 250 and 255. The sealing lines 235, 245 together with the adjoined layers define an inflatable bladder 240 that is capable of retaining pressurized air. In one embodiment, the bladder may be from one or more sheets of air impermeable material, such as PVC, or a laminated material. Further, the bladder layers may be welded to one another along the bladder sealing lines 235, 245, although other ways of forming the bladder lines and the inflatable bladders are within the scope of the invention. The bladder 240 may be formed on the inner surface of the wrap 200, the inner surface being the side that contacts the patient's leg. Alternatively, the bladder 240 may be sandwiched between layers fabric comprising the wrap.

Apart from the bladder 240, the wrap 200 may be comprised of a fabric, such as an elastic fabric, comprised of natural and/or synthetic fibers. A nonlimiting example of a suitable fabric is brushed nylon. One or more fabric layers may be used. The overall shape of the wrap 200 is not limited, except that it must be sized and shaped to surround a substantial portion of the patient's lower leg.

The ventilation port 260 extends through the wrap from the inner surface to the outer surface. The opening of the port at the inner surface may be covered with a porous fabric, to cushion the patient and diffuse air vented through the port. During ventilation, compressed air from the bladder 240 is exhausted through the port 260 via the controller module 100. The exhausted air contacts the patient's leg, thereby reducing temperature and sweating and increasing comfort. The well ventilated leg is far less conducive to developing sores. Concomitantly, the increased comfort of ventilation, improves the chance of adoption and use by patients.

Figure 6:
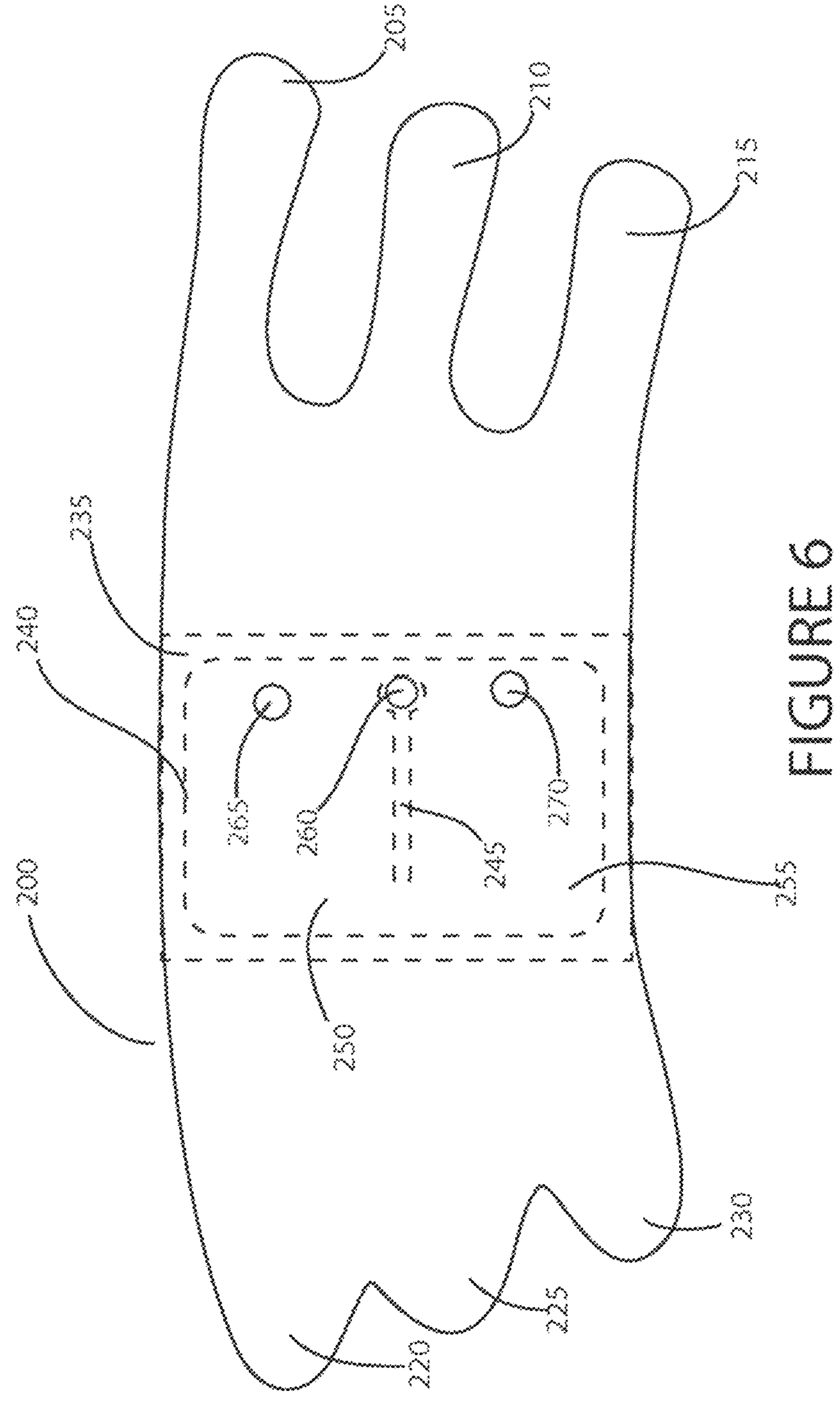
FIG. 6 is a top (i.e., outer side) view of an exemplary compression wrap for a portable intermittent pneumatic compression system according to principles of the invention.

With reference to FIG. 6, an outer side view of the exemplary compression wrap 200 according to principles of the invention is provided. In this view, two additional ports 265,270, each of which leads to a portion of the bladder 240 are shown. One of the ports 265 is a sensor port, through which pressure of the bladder is sensed. The other port 270 is a fill port, through which the bladder is intermittently inflated. Locating the sensor port 265 away from the fill port 270 helps to ensure accurate pressure readings. Such accuracy is important to ensure that adequate, but not excessive, pressure is intermittently applied.

The intermediate sealing line 245 that divides the bladder 240 in two sections 250, 255, provides a dam that impedes flow of compressed air from one section 255 of the bladder 240 to the other section 250. The tendency of the bladder material to lay flat along with the narrow conduit(s) between the sections 250, 255 as defined by the sealing line 245, impedes such flow. Such flow impediment causes the bladder to inflate progressively, with one section 255 inflating before the other section 250. Thus, the invention achieves progressive inflation without complex plumbing, valves, and the like. In an exemplary embodiment, the compression wrap includes releasably mateable and adjustable fasteners, such as, but not limited to, hook and loop fasteners that are adjacent to opposite lateral edges 220, 225, 230 or straps 205, 210, 215 of the compression wrap 200. The fasteners should allow repeated and frequent removal and adjustment of the wrap 200.

Figure 7:
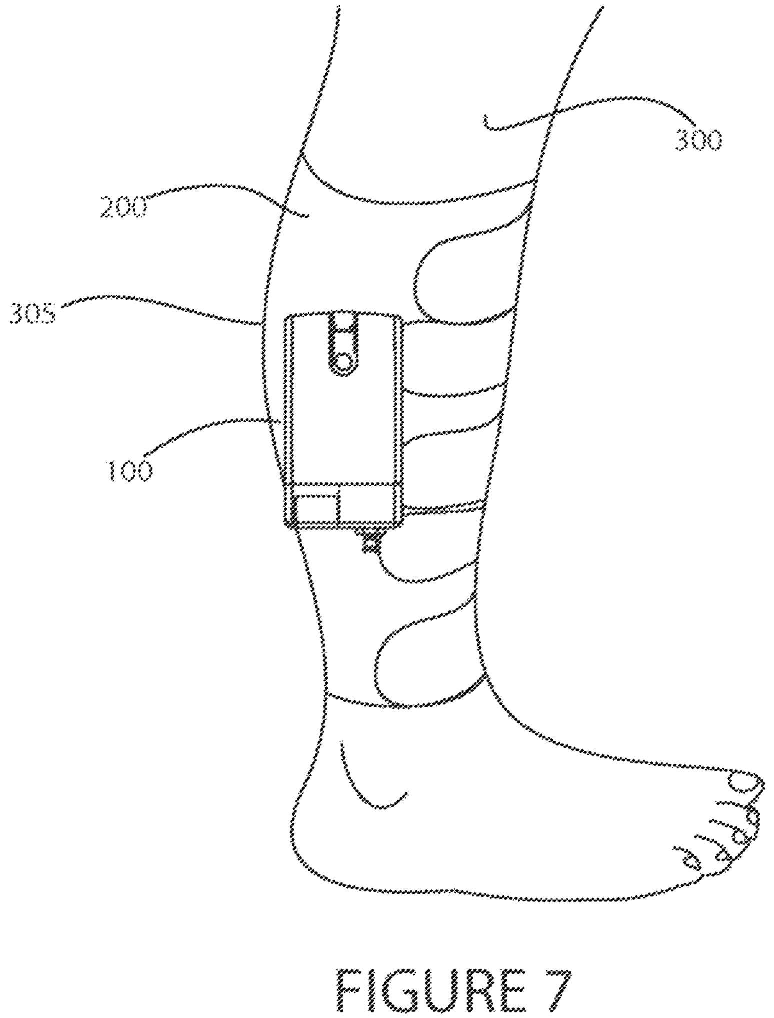
FIG. 7 is a side view of a lateral surface of a lower portion of a patient's leg wearing an exemplary portable intermittent pneumatic compression system according to principles of the invention.

Now referring to FIG. 7, a portable intermittent pneumatic compression system according to principles of the invention is shown wrapped on a patient's lower leg. The wrap 200 is positioned with the bladder against the posterior side 305 of the lower leg 300. The module is positioned along the lateral side of the leg 300. The wrap 200 is securely releasably fastened around the limb 300. During inflation, the bladder in the wrap is progressively filled. In a preferred implementation, filling and compression starts at the bottom of the wrap and progresses towards the top of the wrap. The pressure is sensed through a sensing port at the top of the module. When a desired pressure is attained, inflation ceases and the pressure is temporarily held, e.g., for 2 to 10 seconds. Then the bladder is deflated by venting air through the exhaust port between the wrap and leg. The vented air conditions the leg, thereby increasing patient comfort and endurance. With reference now to FIG. 8, a high level block diagram conceptually illustrating electronic, electro-mechanical and pneumatic components of an exemplary controller module for a portable intermittent pneumatic compression system according to principles of the invention is provided. The module houses a pump 460 which is actuated by a relay or other switch 455 coupled to a microcontroller 415. By way of example and not limitation, the pump 460 may be a 1.8 1/ m 6 V DC air pump. A tube 450 connects the pump 460 to a solenoid valve 440 having an inlet and two outlets. The microcontroller activates the pump during a filling cycle. When the pump 460 is activated, the solenoid valve 440 directs the pressurized air flow through a tube 445 leading to the fill port 150. One or more check valves may be provided to vent pressure to the atmosphere if pressure increases above a determined limit (e.g., 100 mmHg). An example of such a check valve is valve 435 in FIG. 8. The valve could alternatively be connected between the fill port 150 and the solenoid 440.

A pressure sensor 400 is in fluid communication with the sensor port 140. The sensor 400 produces an output signal corresponding to sensed pressure. When the sensed pressure reaches a determined fill limit, a pressure switch 405 is activated. The pressure switch signals the microcontroller 415 that the fill pressure (e.g., 50 mmHg) has been reached. The microcontroller ceases filling by deactivating the pump 460 via the relay 455 and causing the solenoid 440 to close both outlets or close the outlet to the vent and the inlet to the solenoid, when the fill pressure has been reached. The microcontroller then waits for passage of a determined time duration to initiate the venting cycle.

During venting, the microcontroller 415 causes the outlet ports of the solenoid 440 to open. This provides a path for fluid to flow from the fill port 150 through tube 445, through the solenoid 440, through the vent tube 485 and out of the vent port 145, between a patient's limb and the wrap 200. After venting, the fill cycle is repeated. The process of filling, delaying, and venting, repeats to provide intermittent compression.

Electric power is supplied through an external source such as a wall adapter via electric port 475 and DC jack 465. When the external source is removed, electric power may be supplied through a removable battery 470. However, battery power will provide only a limited duration of power sufficient to run the module. For example, a 9V DC battery may power the module for about an hour. After the battery is consumed it may be replaced with a fresh battery or power may resume through a wall adapter.

The microcontroller may be coupled to various lights, audible output devices and displays. In the exemplary embodiment, two lights (i.e., LEDs) 420 and 425 are provided to indicate power on, status and problem conditions. Additionally, an audible output device 430 such as a speaker is provided for audible alerts. By way of example and not limitation, visible and/or audible alarms are appropriate to alert a user to pressurization problems (e.g., insufficient or excessive pressure) and low battery conditions. The alert may be progressive with volume, intensity or frequency increasing with time if an alarm remains unattended. The microcontroller may also eventually temporarily shut down the module until a detected problem is resolved.

As discussed above, a data communications port 135, such as a USB port, is communicatively coupled to the microcontroller. The port provides a means for remote activation and control of the unit. The port also provides means for data acquisition. The microcontroller may include or be coupled to nonvolatile RAM for data storage. Such data may include timed stamped usage logs and corresponding sensed pressure data.

Figure 9:
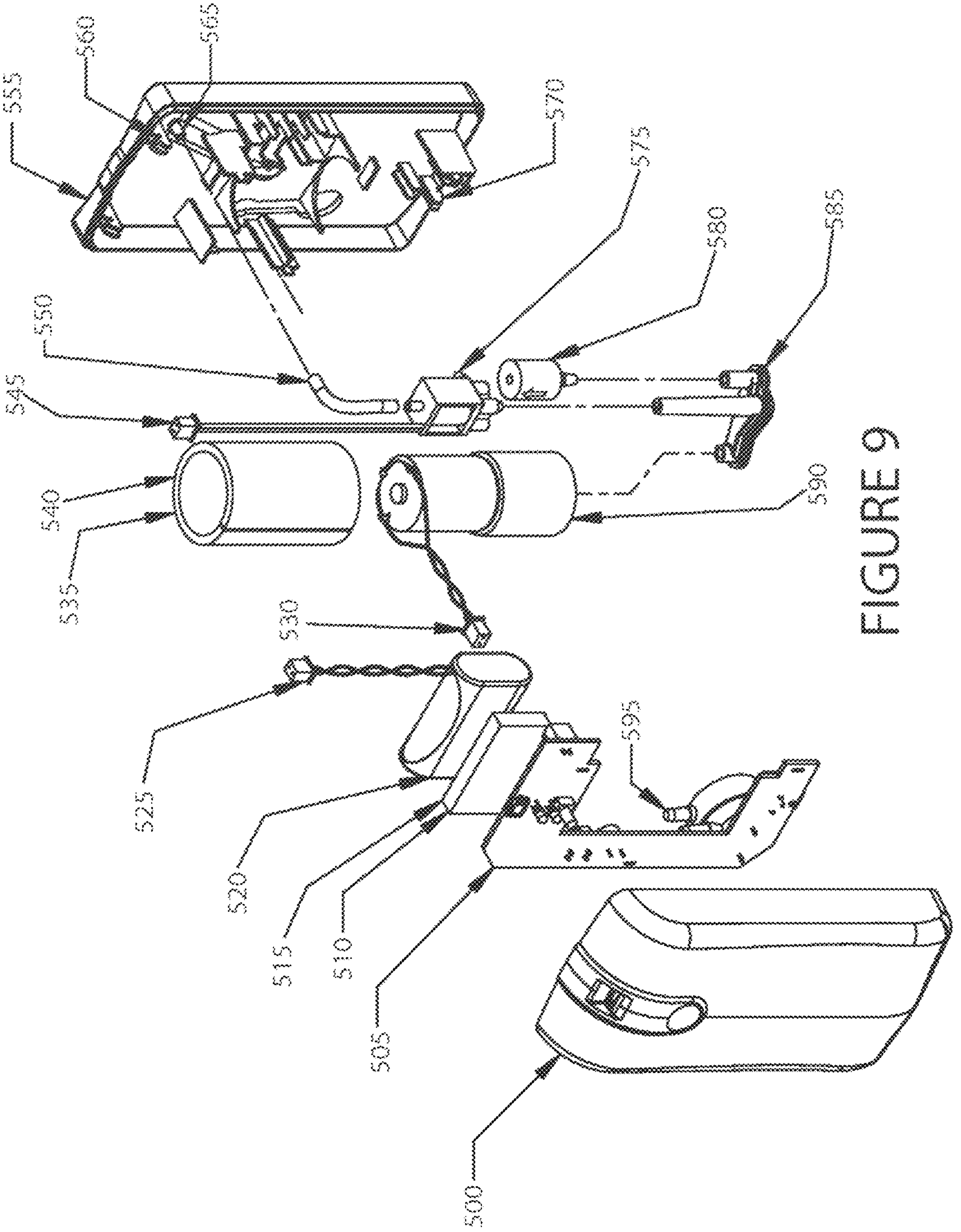
FIG. 9 is an exploded perspective view of an exemplary controller module for a portable intermittent pneumatic compression system according to principles of the invention.

Referring to FIG. 9, an exploded perspective view of an exemplary controller module for a portable intermittent pneumatic compression system according to principles of the invention is provided. A front case 500 and a back case 555 attach together with snap fit fasteners 560 to form a housing. A printed circuit board 505 includes circuitry and electronics components comprising the control module 100. One or more insulating elements, such as foam pads 510, 515 separate the battery 520 from the PCB 505. A connector 525 electrically couples the battery to the printed circuit board 505. A similar connector 530 couples a motorized pressure pump 590 to the printed circuit board 505. One or more foam layers 535, 540 may be wrapped around the pump 590 to reduce noise and vibration. Another electrical connector 545 is provided for a valve assembly, which in the exemplary embodiment is a three-way solenoid valve 575 with four ports. The solenoid valve 575 may be selectively set to allow pressurized air to flow from the pump 590 into a first port of the solenoid valve 575 and out of a second port of the solenoid valve 575 and into the bladder 240 of the wrap 200 through a first port of the bladder 240 and, then, to maintain the bladder 240 in an inflated state, and then to allow flow of pressurized air from the inflated bladder 240 via the first port of the bladder 240 through the second port of the solenoid valve 575 to a third port of the solenoid valve 575 to a ventilation port 565. Ventilation tube 550 fluidly couples the solenoid valve 575 to the ventilation port 565 in the back case 555. A pressure sensor 595 on the printed circuit board 505 is fluidly coupled to the bladder 240 of the wrap 200.

In the depicted exemplary embodiment, snap fit fastening elements 565, 570 secure the back case 555 to the front case 500. However, other fasteners may be used without departing from the scope of the invention.

A manifold 585 fluidly couples the outlet of the pump 590 to a port (i.e., the inlet port) of the solenoid valve 575 and to a check valve 580. The check valve 580 is a pressure relief valve that prevents excessive inflation.

A ventilation port of the solenoid valve 575 is fluidly coupled to a ventilation tube 550. During ventilation, compressed air from the bladder 240 flows through the tube 550, through the ventilation port 260 extending through the wrap, to the patient's leg. The exhausted air contacts the patient's leg, thereby reducing temperature and sweating and increasing comfort. The well ventilated leg is far less conducive to developing sores. Concomitantly, the increased comfort of ventilation, improves the chance of adoption and use by patients.

The inlet port and exhaust port of the solenoid valve 575 are discussed above. The valve also includes a port for directing pressurized air into the bladder 240, and another port for venting air from the inflated bladder. Air vented from the bladder 240 through the vent port is directed to the exhaust port, so that it may be used to ventilate the wearer's wrapped leg.

Figure 10:
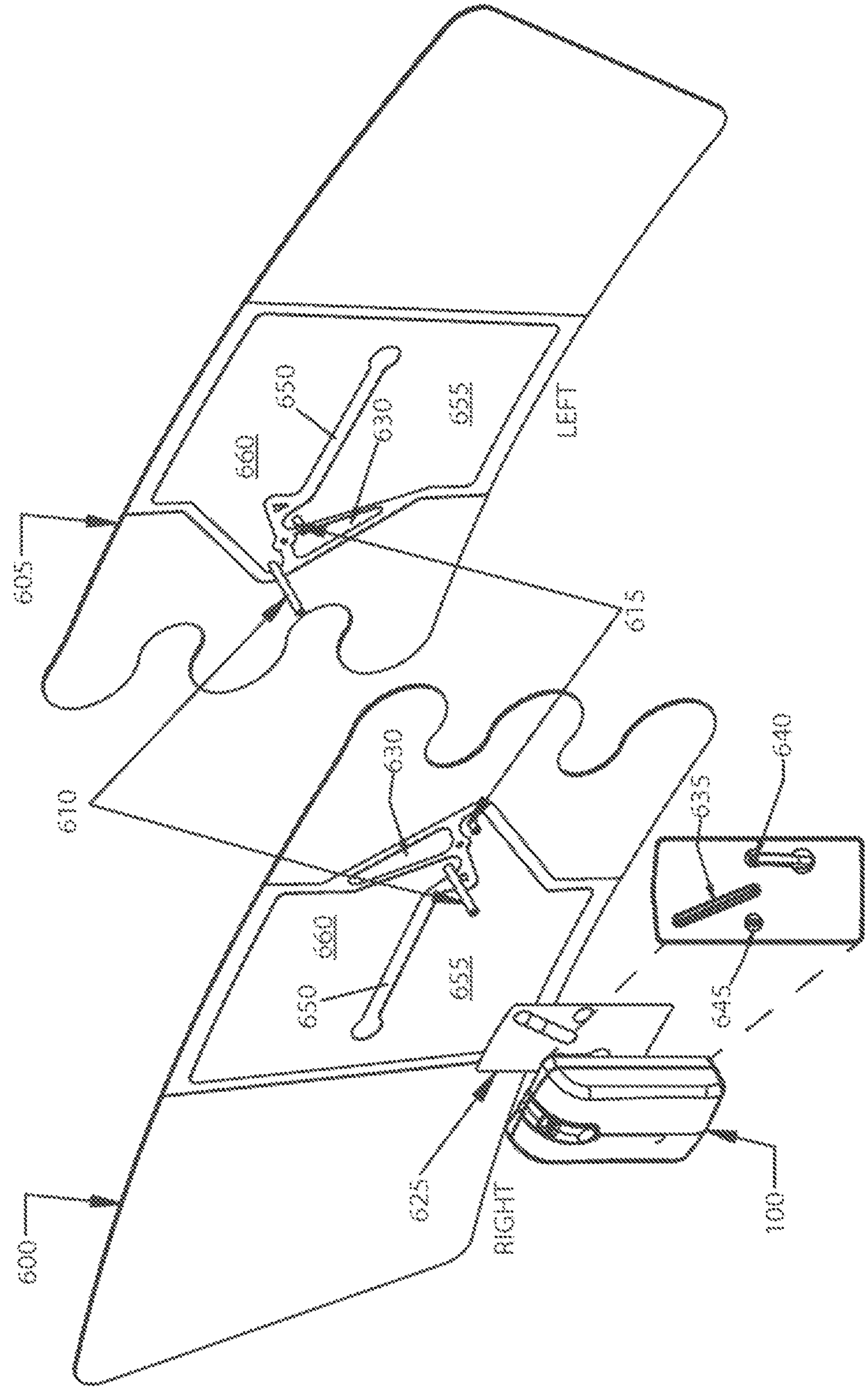
FIG. 10 is an exploded perspective view of an exemplary compression wrap for a portable intermittent pneumatic compression system according to principles of the invention.

Exemplary embodiments of right 600 and left 605 leg wraps are conceptually illustrated in FIG. 10. The exemplary wraps are consistent in all material respects with the wrap 200 described above. As shown in the particular non-limiting exemplary embodiments of FIG. 10, a module 100 is attachable to each wrap 600, 605, using a heat activated adhesive sheet 625 with die cut apertures to allow all required fluid couplings. Each wrap 600, 605 includes a pressure sensing port 610 which is coupled to the pressure sensor 595 of the printed circuit board 505. Each wrap also includes an inflation/deflation port 615, for pumping air into the bladder of the wrap and then evacuating the air from the inflated bladder. Each wrap also includes a ventilation port, e.g., an oblong ventilation port 630, which allows fluid (i.e., air) to pass through the wrap to the wearer's leg. Corresponding ports are provided in the back cover of the module 100 and the overlaying die-cut adhesive sheet 625, including a ventilation port 635, an inflation/deflation port 640 and a pressure sensor port 645.

The oblong ventilation port 630 may be covered with a fluid permeable fabric or other flexible permeable sheet-like material. Likewise, the side of the wrap in contact with a wearer may be covered with a fluid permeable fabric or other flexible permeable sheet-like material that is suitable for long term contact with a wearer's skin.

The bladder portion of each wrap includes a peninsula-like section 650 that substantially divides the bladder into two sections 655, 660. In other words, the bladder is compartmentalized, with a relatively narrow passageway fluidly connecting adjacent compartments (e.g., sections 655, 660). The first section 655 in direct fluid communication with inflation/deflation port 640 is the first to inflate and deflate. The other section 660 (second section) begins to inflate after the first section 655 has partially inflated, when the pressure in the first section 655 exceed the resistance to fluid flow between the first 655 and second 660 sections. The resistance to flow is attributed to the narrow passageway between the sections of the deflated bladder and the flexible material of the bladder resisting deformation. In this manner, progressive inflation and deflation is achieved, with the first section 655 inflating and deflating before the second section 660.

In the preferred embodiment, the pressure sensor port 610 is in the second section of the bladder 660 and, particularly in a portion of the second section 660 that is most remote from the inflation/deflation port 615. Such remoteness is measured by the flowpath of fluid flowing from the inflation/deflation port 615 to the pressure sensor port 610. Thus, this embodiment of the invention ensures that a determined pressure is achieved in the bladder. If pressure was instead measured close to the inflation/deflation port 615, the pressure in the second section 660 may be considerably lower than the measured pressure in the first section 655, and insufficient to provide therapeutic benefit. While two bladder sections are illustrated, a bladder with multiple peninsula's and multiple sections, may be utilized within the scope of the invention.

Figure 11A:
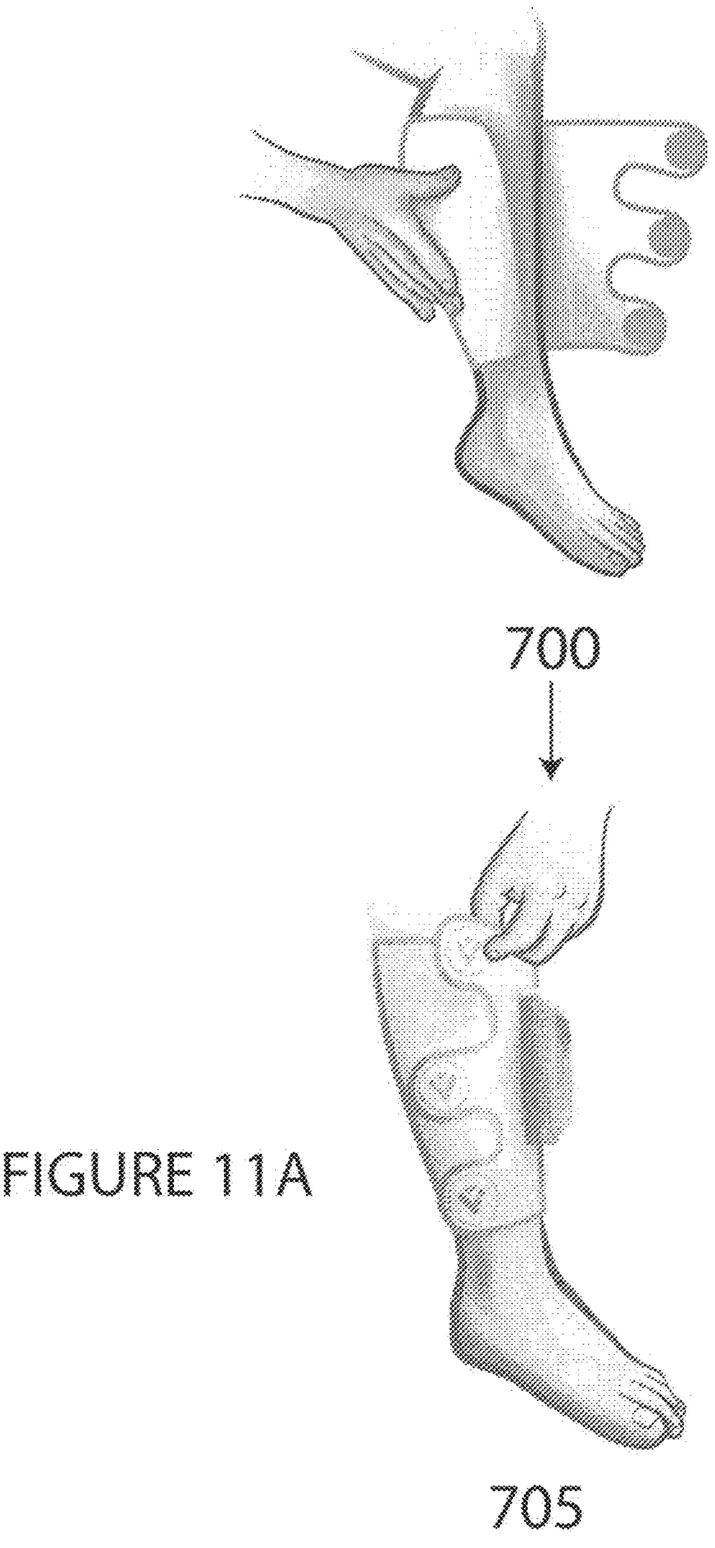
FIGS. 11A-11C conceptually illustrate steps of a method of applying and using an exemplary compression wrap with a portable intermittent pneumatic compression system according to principles of the invention.
Figure 11B:
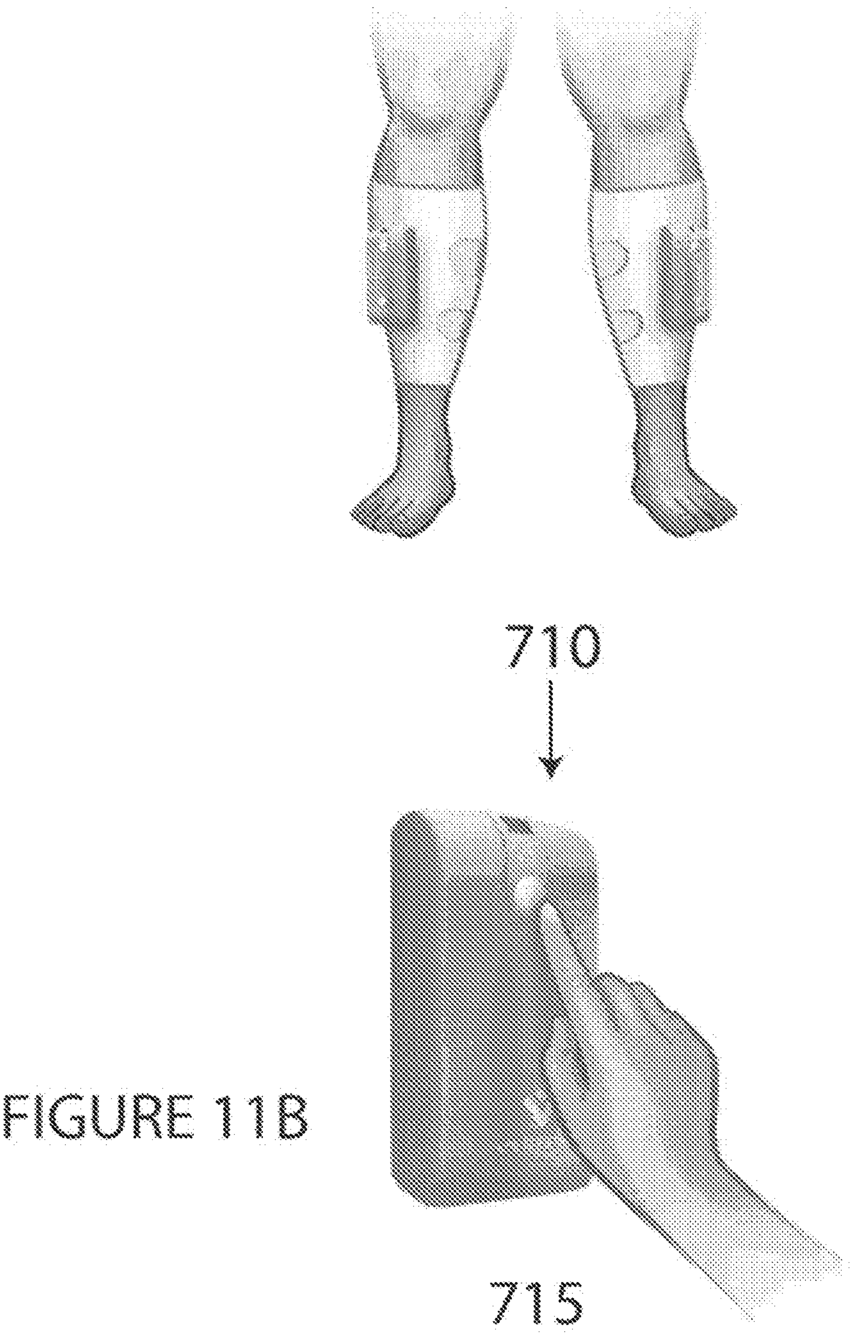
Figure 11C:
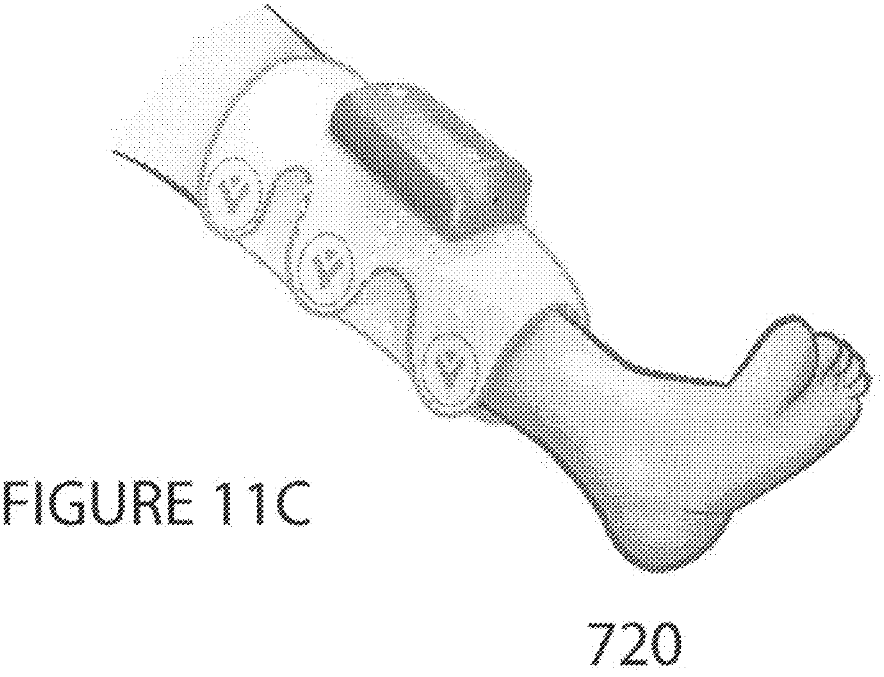

FIGS. 11A-11C conceptually illustrate steps of a method of applying and using an exemplary compression wrap with a portable intermittent pneumatic compression system according to principles of the invention. In step 700 the wrap is wrapped around a wearer's leg. In step 705, the wrap is fastened using available fastening elements, such as hook and loop fasteners. The wrap may be applied to each leg in the same manner as in steps 700 and 705. In a preferred embodiment, the left wrap differs from the right wrap so that the modules are conveniently and comfortably located, as in step 710. In step 715, the module is activated. In step 720, the activated module inflates the bladder of the coupled wrap, maintains the bladder in an inflated state for a determined amount of time, and then deflates the bladder by allowing pressurized air to escape therefrom, and then directs the evacuated air through the ventilation port of the wrap to the underlying leg, where the leg is ventilated.

An exemplary method of providing intermittent pneumatic compression of a limb is also provided. The method includes steps of:

- wrapping at least a portion of the limb with a flexible inflatable wrap containing an inflatable bladder and having an outer surface and an opposite inner surface that abuts the limb when the wrap is worn, the flexible inflatable wrap including a first fluid port in fluid communication with the inflatable bladder, and a second port that extends through the wrap to the inner surface, the second port not is in fluid communication with the inflatable bladder;
- supplying compressed air through the first port of the inflatable wrap and into the bladder, inflating the bladder, until a first condition is determined (the "inflation step"),
- after the first condition is determined, maintaining the bladder m an inflated state until a second condition is determined (the "inflated step"), and
- after the first condition is determined, ventilating air from the bladder through the first port and into the second port of the inflatable wrap and through the inner surface of the flexible inflatable wrap (the "ventilation step").

Pressure may be sensed in the bladder. The first condition comprising sensing a determined pressure. The second condition may be the passage of a determined time duration (e.g., a determined number of seconds).

The inflation, inflated and ventilation steps may be repeated sequentially until the method is concluded, such as by powering down. The inflation, inflated and ventilation steps may be controlled using a solenoid valve (e.g., a three-position solenoid valve) switchable between a plurality of states.

The compressed air may be supplied from a pumping module that may be attached to the flexible inflatable wrap.

The bladder may have a plurality of compartments fluidly coupled by at least one flow restricting fluid passage. The plurality of compartments include a first compartment and a second compartment. The step of supplying compressed air through the first port of the inflatable wrap and into the bladder, inflating the bladder, until a first condition is determined, entails inflating the first compartment before the second compartment. The step of ventilating air from the bladder through the first port and into the second port of the inflatable wrap and through the inner surface of the flexible inflatable wrap, entails deflating the first compartment before the second compartment. Pressure may be sensed in the second compartment.

A portable intermittent pneumatic compression system and method as described above thus provides several advantages over prior compression devices. One advantage is progressive inflation through a compartmentalized bladder. Another advantage is wearer ventilation from compressed air ventilated from an inflated bladder. Another advantage is portability, with a module attached to the leg wrap. Another advantage is accurate pressure monitoring through a sensor in the most remote bladder compartment. These and other advantages are achievable using embodiments of the invention as described above.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A pumping system comprising:

an electronically controlled air pump comprising a pressure sensor, an electronic control unit, and an inflation port, wherein said electronic control unit is adapted to control said inflation port and said pressure sensor;

an inflatable cuff comprising an inflatable bladder, a first compartment of said inflatable bladder coupled to said inflation port, and a second compartment of said inflatable bladder coupled to said pressure sensor through a pressure port; and a peninsula that separates the first compartment from the second compartment and provides a passageway between the first compartment and the second compartment;

wherein the pressure port is remote from the inflation port;

wherein the inflatable bladder has a first end that is adjacent to the pressure port and the inflation port and a second end that is adjacent to the passageway;

wherein said air pump is mounted on the inflatable cuff, wherein a first portion of said air pump is mounted on said first compartment through said inflatable cuff at said inflation port and a second portion of said air pump is mounted on said second compartment through said inflatable cuff at said pressure port;

wherein the pressure port and the inflation port are positioned on a back cover of the air pump between the air pump and the inflatable cuff; and wherein said air pump is adapted to apply compression to a user by enabling air to flow through internal tubing and from said inflation port to said inflatable bladder to inflate said first compartment and said second compartment, said pressure sensor is adapted to measure an air pressure of said second compartment, and the air pressure is not measured through said inflation port and the air does not flow into said inflatable bladder through said pressure port.

2. The pumping system of claim 1 wherein said electronic control unit is further adapted to prevent the air to flow from said inflation port to said inflatable bladder.

3. The pumping system of claim 1 wherein said electronic control unit is further adapted to release compression on said user by enabling air to flow from said inflatable bladder after a threshold measurement of said air pressure is reached.

4. The pumping system of claim 1 wherein said electronic control unit controls said compression applied to said user and release of said compression on said user.

5. The pumping system of claim 1 wherein said air pump is mounted to said inflatable bladder.

6. The pumping system of claim 1 wherein an air pressure of said first compartment is not measured.

7. The pumping system of claim 1 wherein said electronic control unit is further adapted to:

allow said air to flow from said air pumping module pump to said inflatable bladder through said inflation port during an inflation state;

prevent said air to flow to said inflatable bladder during an inflated state; and allow said air to flow from said inflatable bladder to a surface of said inflatable cuff during a ventilation state.

8. The pumping system of claim 1 wherein said inflatable cuff and said air pump are configured to be worn by said user.

9. A pumping device comprising:

an air pump with an inflation port, wherein an electronic control unit is adapted to control said inflation port;

an inflatable wrap that is configured to be worn by a user, wherein the inflatable wrap comprises an inflatable bladder with a first section, a second section, and a separation section, with said inflation port coupled to said first section of said inflatable bladder; and a pressure sensor for measuring an air pressure of said inflatable bladder through a pressure port that is coupled to said second section, wherein said electronic control unit is adapted to control said pressure sensor;

wherein said air pump is mounted on the inflatable wrap, wherein a first portion of said air pump is mounted on said first section through said inflatable wrap at said inflation port and a second portion of said air pump is mounted on said second section through said inflatable wrap at said pressure port;

wherein the pressure port and the inflation port are positioned on a back cover of the air pump between the air pump and the inflatable wrap;

wherein said separation section divides said first section from said second section;

wherein a fluid passageway is defined from the inflation port in said first section around the separation section and to the pressure port in said second section;

wherein the inflatable bladder has a first end that is adjacent to the pressure port and the inflation port and a second end that is adjacent to the fluid passageway;

wherein said air pump is adapted to inflate said first section of said inflatable bladder through a first line; and wherein said first line is internal to said pumping device.

10. The pumping device of claim 9 wherein said inflation port is connected by said first line to said first section and said pressure sensor is connected by a second line to said second section, wherein air flows from said inflation port to said second section through said first section and said air pressure is only sensed through said second line.

11. The pumping device of claim 10 wherein said separation section is a peninsula section that provides said fluid passageway between said first section and said second section.

12. The pumping device of claim 9 wherein said electronic control unit is further configured to prevent air to flow from said inflation port to said inflatable bladder.

13. The pumping device of claim 9 wherein said electronic control unit is configured to enable air to flow from said inflatable bladder after said inflatable bladder has been inflated.

14. A wrap to be worn by a user comprising:

an inflatable bladder comprising a first compartment, a second compartment, and a separation section, wherein said separation section divides said inflatable bladder into said first compartment and said second compartment and provides a fluid passageway between the first compartment and the second compartment;

an air pumping module comprising an electronic control unit, an inflation port, a pressure port, and a pressure sensor, wherein said air pumping module is mounted to the wrap and said electronic control unit is adapted to control said inflation port and said pressure sensor; and wherein said inflation port is coupled to said first compartment and said pressure sensor is coupled to said second compartment and the inflation port is separated from the pressure sensor by the separation section;

wherein the inflatable bladder has a first end that is adjacent to the pressure port and the inflation port and a second end that is adjacent to the fluid passageway;

wherein a first portion of said air pumping module is mounted on said first compartment through said wrap at said inflation port and a second portion of said air pumping module is mounted on said second compartment through said wrap at said pressure port;

wherein the pressure port and the inflation port are positioned on a back cover of the air pump between the air pump and the wrap; and wherein said air pumping module is adapted to apply compression to the user by enabling the air to flow through a first internal line and from said inflation port to said inflatable bladder to inflate said first compartment and said second compartment.

15. The wrap of claim 14 wherein said air pumping module is mounted to the inflatable bladder.

16. The wrap of claim 14 wherein said inflation port is connected by said first internal line to said first compartment for inflation of said inflatable bladder and said pressure sensor is connected by a second internal line to said second compartment for sensing pressure of said inflatable bladder in said second compartment.

17. The wrap of claim 14 wherein said electronic control unit is further adapted to enable said air to flow from said inflatable bladder after said inflatable bladder has been inflated.

* * * * *